(12) United States Patent
Mackey et al.

(10) Patent No.: US 6,567,767 B1
(45) Date of Patent: May 20, 2003

(54) TERMINAL SERVER SIMULATED CLIENT PERFORMANCE MEASUREMENT TOOL

(75) Inventors: Kyle Joseph James Mackey, Aliso Viejo, CA (US); Lauren Ann Cotugno, Dove Canyon, CA (US); Joseph Kuoweng Chan, Mission Viejo, CA (US); Matthew James Hengst, Lake Forest, CA (US); Mark Douglas Whitener, Aliso Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 171 days.

(21) Appl. No.: 09/664,100

(22) Filed: Sep. 19, 2000

(51) Int. Cl.7 .......................... G04F 15/173; G04F 10/00
(52) U.S. Cl. ........................................ 702/186; 702/182
(58) Field of Search ................................ 702/186, 182, 702/187; 709/203, 219, 224

(56) References Cited

U.S. PATENT DOCUMENTS

| | | | | |
|---|---|---|---|---|
| 6,041,352 A | * | 3/2000 | Burdick et al. ............. | 709/224 |
| 6,070,190 A | * | 5/2000 | Reps et al. .................. | 709/224 |
| 6,108,700 A | * | 8/2000 | Maccabee et al. .......... | 709/224 |
| 6,178,449 B1 | * | 1/2001 | Forman et al. ............. | 709/224 |
| 6,202,036 B1 | * | 3/2001 | Klein et al. ................. | 702/178 |
| 6,215,774 B1 | * | 4/2001 | Knauerhase et al. ........ | 370/252 |
| 6,308,211 B1 | * | 10/2001 | Rosborough et al. ....... | 709/224 |

* cited by examiner

Primary Examiner—Marc S. Hoff
Assistant Examiner—Paul Kim
(74) Attorney, Agent, or Firm—Alfred W. Kozak; Mark T. Starr; Lise A. Rode (57) ABSTRACT

A performance measurement tool is developed to measure performance of a terminal server servicing multiple Clients who operate on remote systems in a farm of multiple PC's. Test scripts to simulate actual operating conditions are run on each PC Client-User over a sequence of time which varies the number of concurrently active PC Client-Users from a small number of Users to a vary large number of current Users. During this test period, a record is kept of designated simulated-user-initiated actions such as log-on times, time to open various application programs, and character entries thus to determine acceptable operating configurations.

3 Claims, 5 Drawing Sheets

TERMINAL SERVER SIMULATED CLIENT PERFORMANCE MEASUREMENT TOOL

CROSS-REFERENCE TO RELATED APPLICATIONS

This case is related to a co-pending application, U.S. Ser. No. 09/661,101 entitled "TERMINAL SERVER DATA FILE EXTRACTION AND ANALYSIS APPLICATION", which is incorporated herein by reference.

BACKGROUND OF THE INVENTION

In the situation involving networks where numerous client terminals are connected to a test server, it is desirable to obtain information as to the actual execution times for accessing programs, and also for example, accessing information about the time required for executing different parts of available programs.

Thus, a performance and measurement system for defining and measuring user-relevant response times to remote client stations which are serviced by a terminal server, is of great importance to evaluate the status of a network of users and terminal servers.

Performance data produced by the interaction of the client-users and the terminal server is collected and subsequently logged. Once the data is logged, the data may then be accessed and collected by an Administrator in order to evaluate the system responses involved in the network.

Performance tools are used to measure the performance of the test server in regard to its availability of servicing the various and multiple clients. A resultant state of the system may be accomplished in order to evaluate the total resource utilization of the system. Such a determination may eventually discover which resources cause slowdowns or bottlenecks in system performance, and once identified, these resources can be upgraded to improve system performance.

Another useful purpose for evaluating computer performance may be for what is called "application tuning" in order to focus on particular user applications or situations in order to determine how to improve system performance regarding a particular application.

Another use for performance tools is for the purpose of troubleshooting and to help determine why system performance may be degrading without any immediately apparent reason.

In many situations, so-called performance tools have generated too much information making it difficult for an operator-user to fully comprehend the nature of what is happening. If a system gathers and logs huge amounts of information, this requires large memory sources for data logging and is often very difficult to analyze, in addition to taking a lot of processing power to generate this information and then to try to present this data into a form that is useful to a user.

It is always a problem to identify when the performance of a system has been degraded beyond acceptable limitations. Many of the earlier attempts for such analysis provided only indirect information regarding the end-user's performance expectations in addition to requiring extraordinary administration and management efforts in the system to develop the required information. Many of the earlier systems were influenced by the test environment characteristics and did not provide feedback for the actual client sessions under test. As a result, this necessitated the opening of additional terminal server connections which were administratively time-consuming and caused significant additional CPU overhead.

Figure 5:
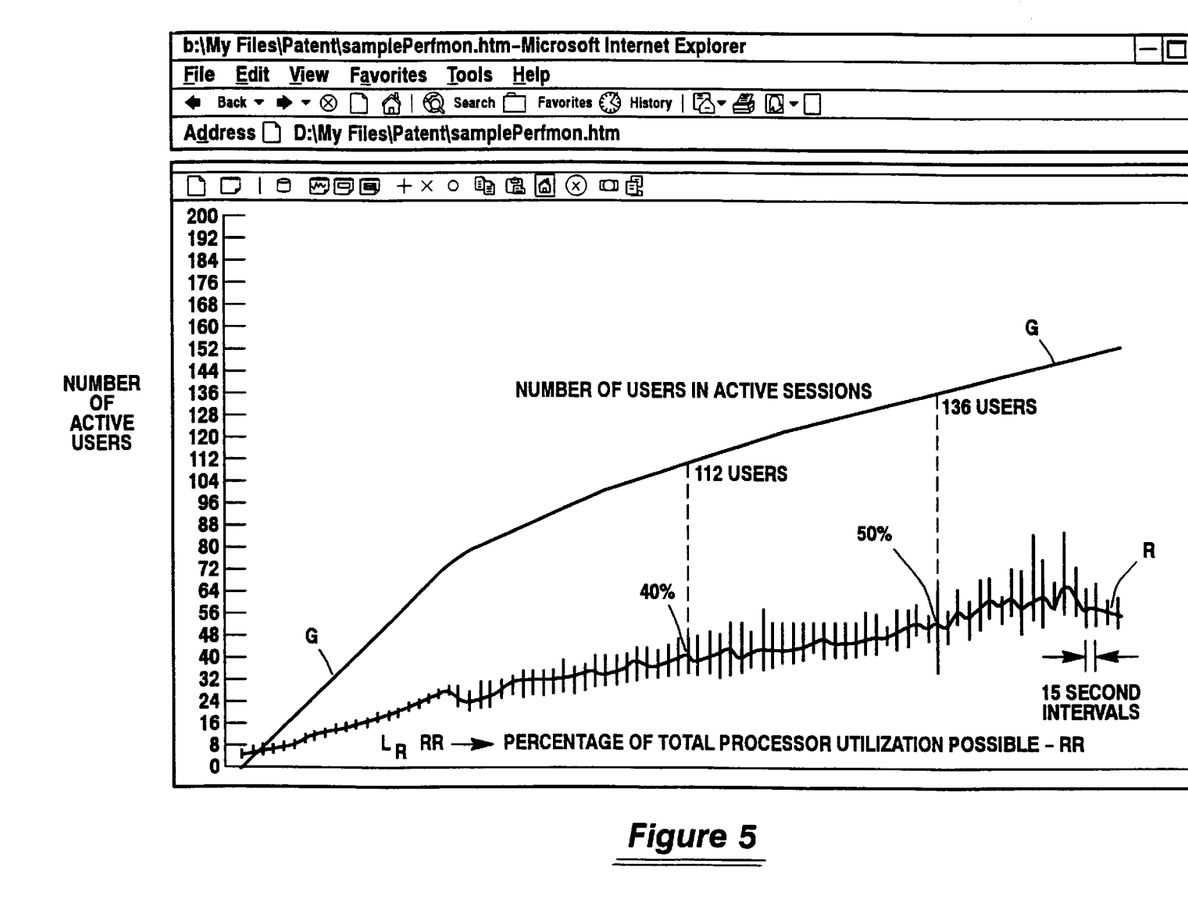
FIG. 5 is a graph showing the number of simulated client users (G—G) while also indicating another graph (R—R) which shows the percent utilization of the total possible utilization for each point of the number of active Client-Users.

FIG. 5 is an illustration of one type of earlier performance measurement which was only partially useful as it only provided very limited information regarding processor utilization which limited the user's ability to evaluate the conditions of operation.

The presently described system and method will be seen to measure and collect the response times for any variety of designated actions initiated by terminal server scripts. The method will be seen to call a timer utility before and after each designated action, such as logging on, opening applications, and typing of characters.

Then, by noting the response times involved during a sequence of different operating conditions (small number of concurrent client-users over to a large number of concurrent client-users) it is then possible to determine what are the acceptable and non-acceptable operating limits for the entire system.

SUMMARY OF THE INVENTION

In a system where multiple client-users are connected via hubs and switches to a back-end server, there is provided a method whereby a program is provided to measure, collect, and analyze the response times for any variety of designated actions initiated by terminal server scripts, and whereby the calling of a timer utility, before and after designated actions, will provide information on the resulting response times.

Because the timing components are added to existing client scripts, rather than adding new scripts, the timing components are minimally intrusive to the load on the server under test. The timing component provides data for all the sessions involved in any given test and the timer is integrated into sessions that are already part of the test environment.

Actions can be designated for measurement such that the resulting data can be analyzed and is directly relevant to the end-user's real world performance expectations. The resulting data is minimally influenced by any test environment characteristics. To achieve this, the administrator modifies existing scripts by adding commands that execute strictly on the Remote Client PC.

The accumulated response times are saved to the Client PC-User terminals.

GLOSSARY OF RELEVANT TERMS

ACTION LABEL: An action label is a descriptive name that an administrator assigns to an action that he/she has decided to measure using the Terminal Server Simulated Client Performance Measurement Tool. On Table III of co-pending U.S. Ser. No. 09/661,101, there are six action labels for discreet actions that were designated within the TS Scripts for measurement. These action labels are: Connect, Excel, Outlook, Cmd Prompt, Explorer, and word.

BACK END SERVERS: Servers that form the infrastructure for the test environment. Various applications and user functionality is supported by these servers with the intent of modeling a real world environment. These include the Internet Information Server (IIS), the Primary Domain Controller (PDC), the Exchange Server, and File and Printer Server, plus a Monitor, Control and Test Server.

CLIENT SCRIPT: A looping list keyboard input that is fed from the TS (Terminal Server) Client Software to the Test Server in order to mimic real user input. The script sends the appropriate keyboard sequence to log into a Windows session, to open Excel, Outlook, Internet Explorer, Word, and perform common real world actions within each application (i.e., creating graphs, printing, sending email, browsing web pages). StartTimer and StopTimer calls before and after designated activities are inserted into these scripts.

CONTROL: Control Server station (CONTROL) controls the creation, distribution, and execution of the scripts. It also manages the remote Client PCs as they execute the scripts, and timer functions.

EXCHANGE: A server that hosts and allows email services.

GRAPHICAL UPDATE: When a user/or simulated user delivers some form of input (pressing the letter "k" on the keyboard) to a Terminal Server Client Session, the "k" input is first sent to the Terminal Server over the network. The Terminal Server decides what should happen when this "k" is input. If this "k" input changes what should be displayed on the screen of the Terminal Server Client Session, then the Terminal Server sends that graphical update over the network to the Client Session. If a text editor such as Microsoft Word was open when the "k" was submitted then the corresponding graphical update would add the letter "k" to the appropriate location on the Terminal Server Client window.

IIS: Internet Information Server. Hosts the internet sites that are browsed in the course of the Client Script loop.

LOG FILE: Synonymous with Timer Log File.

MONITOR: The monitor server station (MONITOR) captures all the Performance Monitor data from the test server, and stores the associated logs. This monitoring is done remotely in order to minimize the performance impact on the server under test.

PDC: Primary Domain Controller. This is the system that authenticates user logons for the entire testing domain including the TS Clients who attempt to gain access to the test server.

REMOTE CLIENT PC: A variety of desktop PCs can be used as a remote Client PC. This remote system runs the terminal server client (TS Client). These systems host the client component of the TS connection, the SM Client, and the log files.

SM CLIENT: (Simulated Client) The application which takes a client script and feeds it to the TS (Terminal Server) Client. This process occurs strictly on the remote client PC and therefore does not contribute to the load/stress on the test server.

TERMINAL SERVER CLIENT: A Terminal Server Client is an application that runs on a remote client PC. It receives desktop graphics from the test server and sends user initiated mouse movements and keyboard strokes to the test server.

TERMINAL SERVER EDITION: A special version of NT4 Microsoft Operating system that incorporates a multi-user kernel and allows numerous simultaneous client sessions. The Windows 2000 equivalent does not require a special edition of the operating system, but instead requires an additional "Terminal Services" component to be installed.

TERMINAL SERVICES: Although the process is virtually transparent to the user, terminal services gives remote users the capability to run the Windows desktop and applications from a central server. A small application, Terminal Server Client, is installed on the Remote Client PC. The Terminal Server Client sends mouse movements and keystrokes and receives the corresponding graphical updates from a central test server.

TEST SERVER: This server is the focus of the testing environment. It runs the Terminal Services enabling operating system (NT4 Server Terminal Server Edition, or Windows 2000 Server with Terminal Services component enabled). The test server receives mouse movements and keyboard input over the network sent from the TS (Terminal Server) Clients which are executing on the remote Client PC. The test server hosts the client desktops and applications, sending the resulting graphical updates to the TS Client. The test server is commonly referred to as a central server because it "centralizes" the execution of Windows desktops and applications similar to the way a mainframe works.

TIMER: A unit providing clock time in milliseconds with a resolution equal to the machine cycle speed.

TIMER DYNAMIC LIBRARY: A dynamic linked library piece of the WTS Timer Utility containing multiple programmatic procedures that can be called/initiated from another file. The Client Scripts are modified with calls to this library.

TIMER LIBRARY: Synonymous with Timer Dynamic Library.

TIMER LOG FILE: A file created during the execution of a timer modified Client script. This file details the results of the timing actions, with the name of the action measured, the time in milliseconds the action took to execute, and the time/date of the entry to the log file.

USER ID: Each TS (Terminal Server) Client has a unique identifier.

DESCRIPTION OF PREFERRED EMBODIMENT

Figure 1:
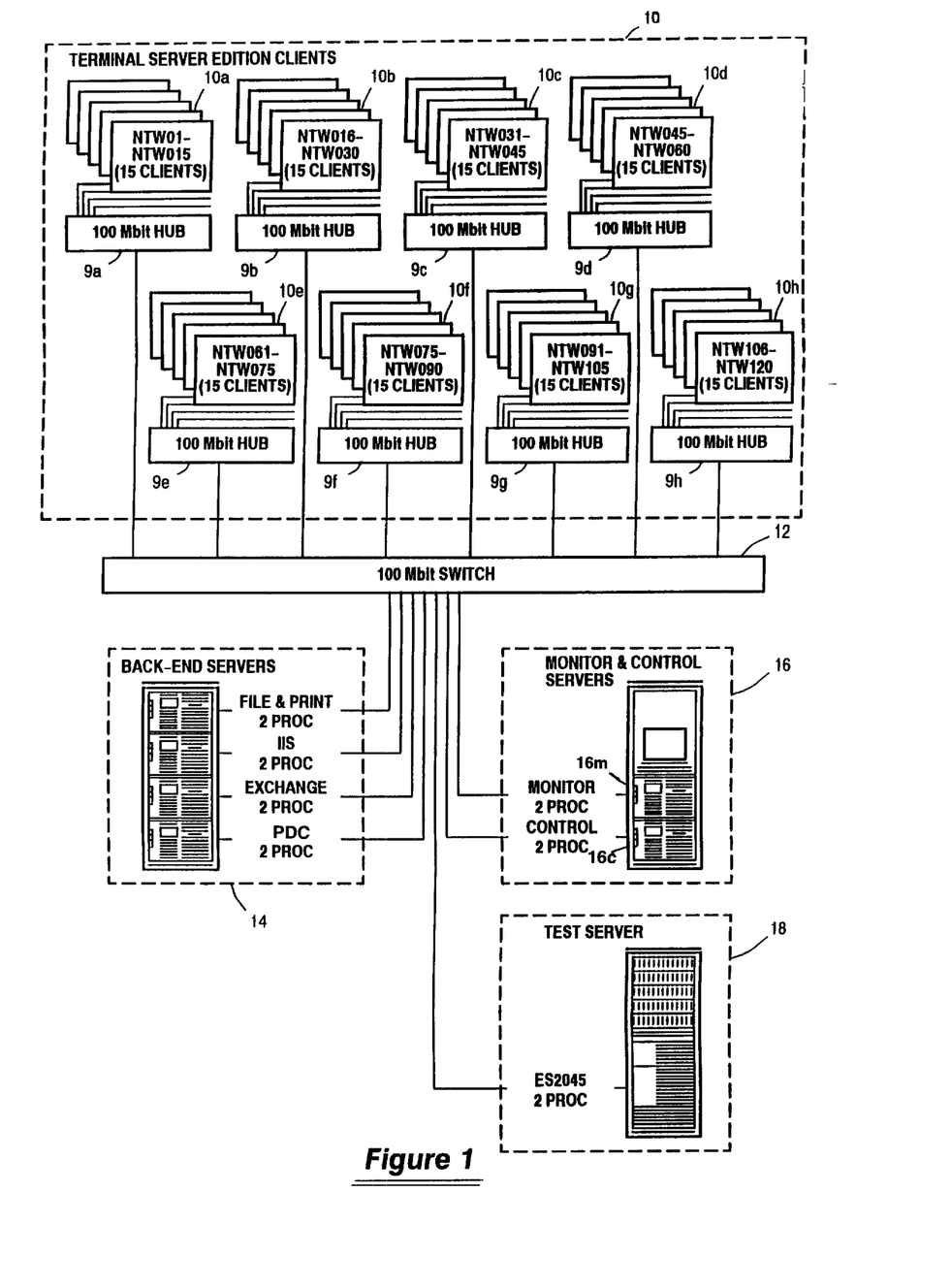
FIG. 1 is a drawing of a system network showing multiple simulated clients connected through a switching device to a set of back-end servers, monitor and control servers, and a test server.

FIG. 1 shows the general overall environment of modules and units which are involved in the computing architecture for a Thin-Client/Server set of installations. The test server 18 contains a terminal server enabled operating system (NT 4 Terminal Server Edition or Windows 2000 Server with Terminal Services enabled). Terminal Services functionality is made possible using three components which are (i) the Terminal Server Operating System, (ii) the Remote Desktop Protocol, and (iii) Terminal Server Client. With the addition of the SM Client (10xsm, FIG. 2) and test script (16ts, FIG. 2) components imaginary users can be created to simulate the work load of real users.

As seen in FIG. 1, there is indicated a PC farm designated as Terminal Server Edition Clients 10. Here there is indicated eight groups of PC's designated 10a, 10b . . . thru 10g, 10h. Each item represents a group of 15. Each group of PCs are connected through a 100 megabit HUB designed as 9a, 9b, . . . 9g, 9h. Also the series of HUBs are connected to a 100 megabit switch 12.

Figure 2:
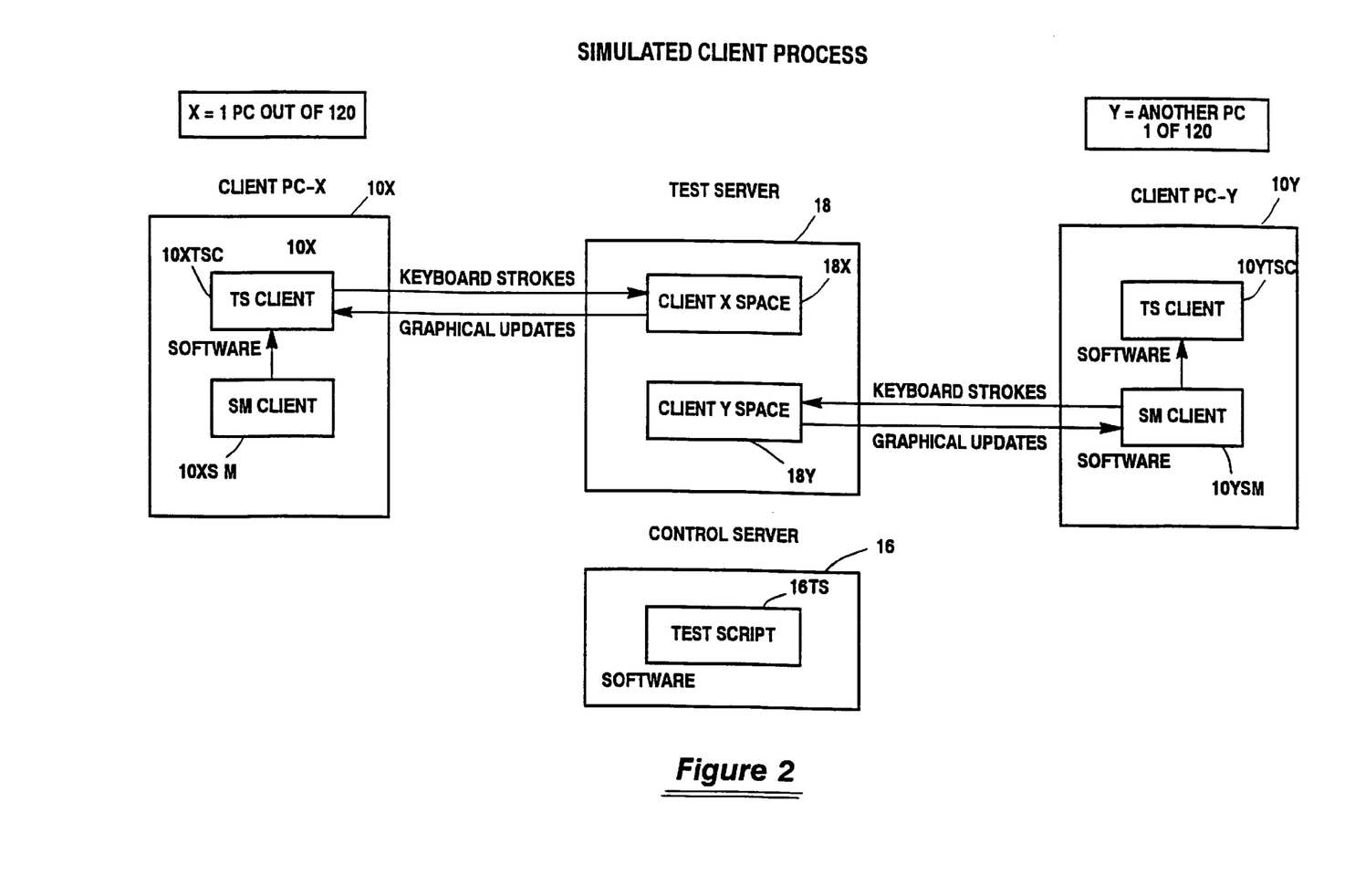
FIG. 2 is a sketch showing relationships between two typical Client-Personal Computers (x,y) in the multitude of Terminal Server Clients, as related to the Control Server and Test Server.

The Terminal Server client software in FIG. 2 (10xtsc, 10ytsc) runs on a range of devices with varying operating systems and enables the users to gain seamless access to 32-bit applications. The Remote Desktop Protocol (RDP) is used to communicate between the client PCs 10 and the test server 18. This component involves a network protocol that connects the client PCs and the test server over the network.

As will be seen in FIG. 1, the testing environment is equipped with 8 sets of 15 PCs 10a, 10b, ... 10g, 10h. With, for example, 120 total PCs, each running one set of Terminal Server client connections, the testing environment can simulate 120 user connections to the test server 18. While each PC (in the Client Group 10) is capable of running multiple Terminal Server connections.

It is important to know the performance and load capabilities for the Terminal Services Operating System, which is installed on test servers, shown as item 18 in FIG. 1. Here this is of considerable value in order to enable designers to plan and size the deployment of Thin-Client/Server Solutions.

The test server 18 of FIG. 1 is designed to deliver reliable performance and scalability to as many Terminal Server Clients 10 as possible without sacrificing optimal performance. A concept of "optimal performance" is defined as a performance that allows the Thin-Client architecture to remain transparent to the user.

In FIG. 1 the Test Server 18 is set up as a test server for running either the Microsoft Windows NT Server 4.0 Terminal Server Edition or Windows 2000 Server with Terminal Services enabled, and is configured with the Office 2000 Suite of applications. The test network of FIG. 1 also provides a monitor (16m) and control (16c) of station 16. The monitor station (16m) captures all the performance monitor data concerning the test server (18) and stores the associated logs. This monitoring is done remotely in order to minimize the performance impact on the server 18 under test.

The control station in 16 controls the creation, distribution, and execution of the scripts. It also manages the remote clients 10 as they execute the scripts. The Monitor-Control servers 16 and Test Server 18 are seen connected to the 100 megabit switch 12.

Now, additionally connected to the 100 megabit switch 12 is a set of Backend Servers 14 which are set up to simulate a real-world environment. These include a Primary Domain Controller (PDC), a Microsoft Exchange Server 5.5 (EXCHANGE), a Microsoft Internet Information Server 4.0 (IIS), and a Microsoft Windows NT server 4.0, used for file and printer sharing (FILE&PRINT).

BENCHMARK PROCEDURES: Experimental operations indicated that "simulated" Office 2000 user scripts would take approximately thirty minutes to loop through Outlook, Word, Access, Excel, and Internet Explorer 5 at a typing speed of forty-eight words per minute. These scripts are designed to match the typical work patterns of real-world users. Tests were made to stress the server under test 18 by logging on simulated Terminal Server clients that were running on these scripts.

The number of concurrent clients was gradually increased while the scripts were cycled through the various applications. Thus multiple test runs were conducted and additional sets of Performance Monitor (PERFMON) log files were produced to verify reproducibility.

BENCHMARK MEASUREMENTS: Using the Microsoft Performance Monitor, performance counters were collected on all the available objects and counters. The counters for Processor Usage, Active Sessions, and Processor Queue Length are activated and a recording is made for percent of total processor usage for each period related to the number of active session Client-users. The performance data thus reflects the stress on the server 18 under test which influences the end-user performance. This is indicated in FIG. 5.

To evaluate end-user performance, timer components are inserted into the test scripts before and after a designated action. For example, timed actions can include (i) log-on time "Connect"; (ii) time to open applications and (iii) character delay while typing.

DEFINING OPTIMAL PERFORMANCE: Optimal performance is the point at which a server is loaded with the maximum number of clients possible without user performance degrading beyond a predetermined limitation. During testing, timer logs are created to measure the delays for completing certain actions from the user's point of view. Ideally, the limitations on delays are determined with the intent of providing a transparent solution to the user, that is to say so that the user could not distinguish that the applications are running on a centralized server, such as server 18.

Table I below is a table showing one possible configuration for a test server undergoing tests. (this is just one possible server configuration) (Test Server 18).

TABLE I

Table I Server Test Configuration

| System Col. 1 | Processor Col. 2 | Cache Col. 3 | Memory Col. 4 | Disk Col. 5 | Network Col. 6 |
|---|---|---|---|---|---|
| ES2045 | Four Intel Xeon processors at 550 Mhz | L2 Cache: 2 MB per processor | 2 GB Memory | External disk array | One Network Interface Card with 100 MB access |

The first column shows the system designation while the second column shows the processors involved as four Intel XEON processors. Column 3 indicates the cache as a L2 Cache, having two megabytes per processor. Column 4 shows the memory utilized as being 2 gigabytes of memory. Column 5 shows the disk as being an external disk array, while column 6 shows the network as involving one network interface card with one hundred megabytes of access.

In order to determine the optimal performance of a terminal server solution, it is required that Test Server 18 be placed under a significant load using Thin-Client simulation. Microsoft provides a scripting engine and language to be used for such testing (the SM Client and associated Testing Scripts). So, in order to "simulate" user operations, there are virtual Thin-Clients which are launched and there are user applications applied within the given session. Then realistic user scenarios are constructed by combining both application and task sequences in the scripts.

The Office 2000 user simulation script was developed for measuring the performance of Office 2000 in a Terminal Server environment. By modifying the scripts to time record the desired actions, the Terminal Server Client Measurement Tool measures and saves data regarding the delays involved in executing these actions.

FIG. 2 is a sketch illustrating the inter-relationships of modules involved in the simulated Client process. Assuming for example, that there are 120 clients as was indicated in FIG. 1, then a typical Client PC-X shows a block designated 10x which indicates several sets of software which reside in Client 10x. One portion of software is designated Terminal Server Client (TS Client) 10xtsc. This piece of software receives information from another set of software designated SM Client, 10xsm.

Likewise, another Personal Computer designated as another typical Client PC-Y is another typical PC residing in the overall farm of 120 PCs. This client is designated 10y. Again, there are two distinct groups of software in the Client Y and these are designated as the Terminal Server Client (TS Client) 10ytsc, which is fed from the package of software designated SM Client 10ysm.

As will be further seen in FIG. 2, there is a Control Server 16 which utilizes a Test Script portion of software designated 16ts. This test script is fed to each of the SM (Simulated) Clients in the Client farm and, in this case, FIG. 2 shows the test script being transmitted to the SM Client 10xsm and also to the SM Client 10ysm. Thus, the test scripts in the Control Server 16 are fed to the software of the SM Client software for each and every one of the PCs. Subsequently then, the SM Client software is then fed to the Terminal Server Client software in each one of the various PCs in the farm 10.

Connected from the Client-PC 10x, it will be seen that each keyboard stroke is provided from the TS Client 10xtsc over to the Client X Space 18x, and the Client X Space 18x feeds back the corresponding graphical update information to the TS Client 10xtsc.

Likewise, in the other typical Client PC-Y, designated 10y, the TS Client 10ytsc will feed an enumeration of keyboard strokes over to the Client Y Space designated 18y, and the Client Y will feed back the corresponding graphical updates back to the TS Client 10ytsc. The Client X Space 18x and the Client Y Space 18y, which is typical of spaces provided for each and every one of all of the active TS Client sessions, are all located in the test server 18.

Figure 3:
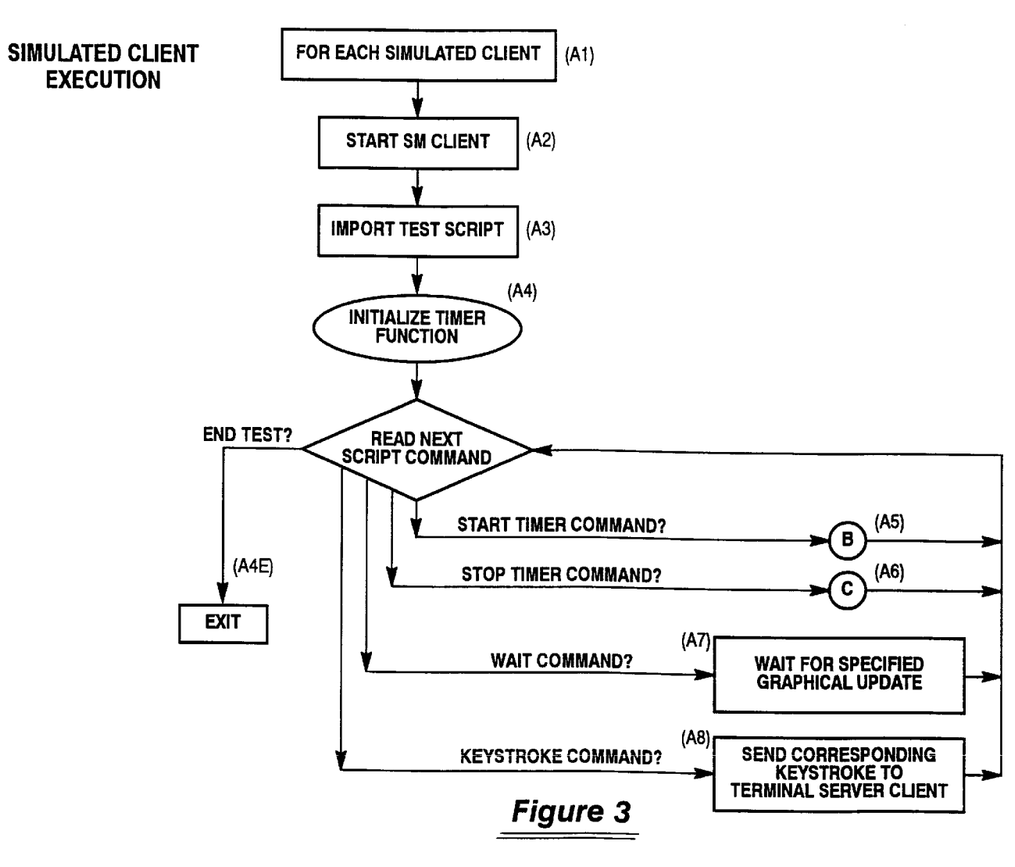
FIG. 3 is a flow chart showing the steps involved for executing applications on each simulated client.

A flowchart for the simulated client execution operations is shown in FIG. 3. This flow will occur for each and every one of the simulated clients 10a, 10b, 10c, . . . 10f, 10g.

At step A1, there is the initiation or start of the SM Client software, such as 10xsm, and 10ysm, etc., (FIG. 2) which will then look for a specific test script for each and every one of the multiple client PCs.

Then, at step A2, there is an importation of the test script from the control server 16 over to each of the various SM Clients, such as 10xsm, 10ysm, etc.

At step A3, there is an initialization of the timer function which will be later seen in FIG. 4.

Step A4 of FIG. 3, is a multiple decision block from where the process sequence can go to—Exit, A4E); to step A5 (B); to step A6 (C); to step A7 (wait for graphical update) or step A8 (execute keystroke command).

At step A4 of FIG. 3, there will be initiated the reading of the next script command from the Control Server 16 where the Terminal Server (TS) client is turned on, followed by a simulated user log-on where the Simulated Client (SM client) application provides a user-name and password.

As the commands are fed from the Simulated Client to Terminal Server Client, the TS Client (10x) (10y) sends a series of keystrokes to the client space (such as 18x, 18y of FIG. 2) in the Test Server 18. After this, at the same time, there will be a "start" of the timer command at step A5, FIG. 3, which indicates the marker B continuing to FIG. 4 for the timer function operation.

Simultaneously at step A7, a Wait command is initiated in order to receive a specified graphical update which was seen in the earlier FIG. 2, whereby the Client X Space, 18x, provides a graphical update to the TS Client, 10xtsc, and also the Client Y Space, 18y, provides the graphical updates to the TS Client 10ytsc.

After the graphical update has been completed, there is initiated at Step A6, the "Stop Timer" command which is later seen in its operative steps through reference marker C onto the timer function program of FIG. 4.

At step A8, there is an execution of the script command which when executed, will return back to step A4 in order to read the next script command.

The script commands will continue to be read until an "End Test" command is encountered and the program will exit at step A4E.

Figure 4:
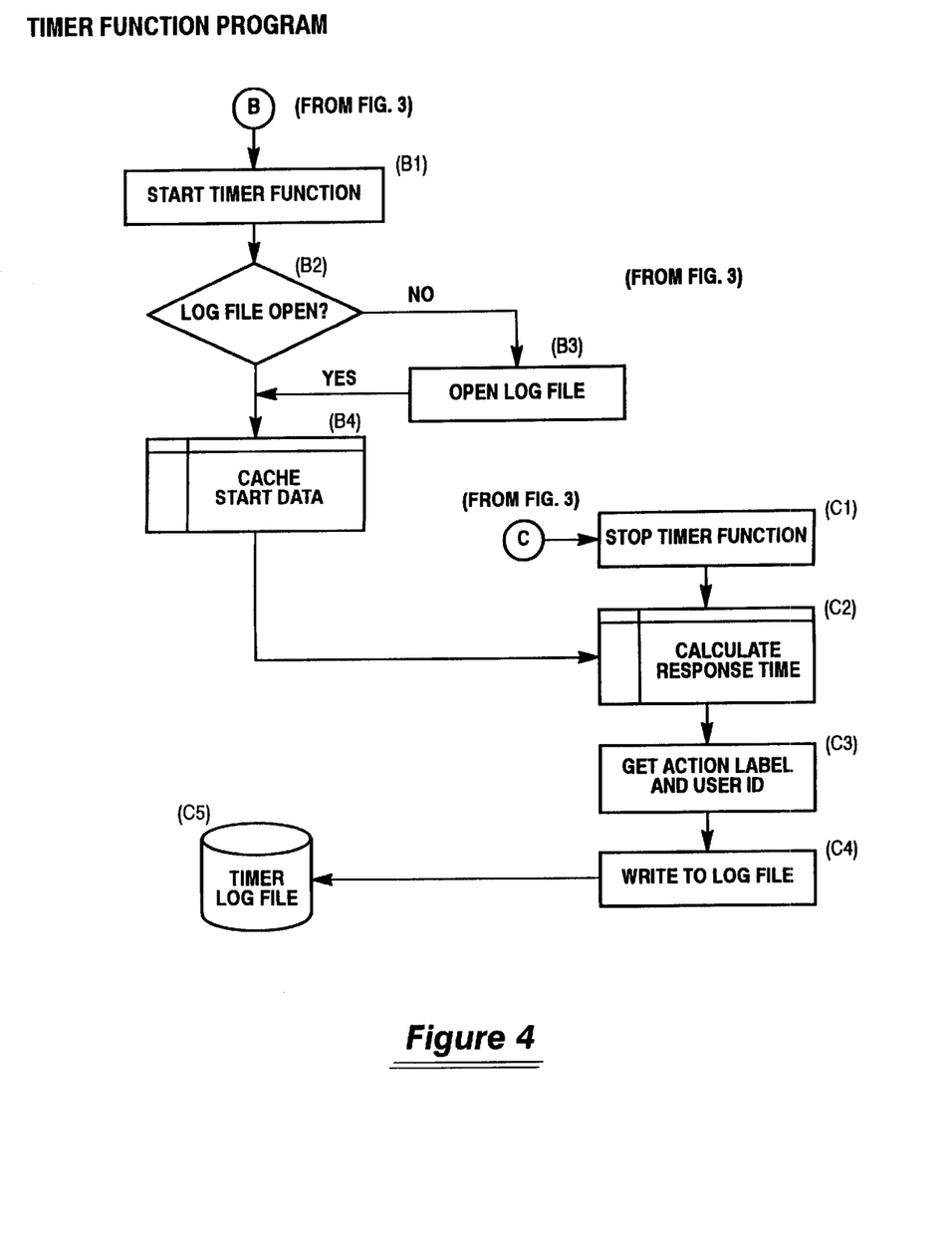
FIG. 4 is a flow chart of the timer function program to calculate response times and record results on the timer log file.

Now referring to FIG. 4, there is seen the timer function program which has been initiated at step B from FIG. 3, and at step C from FIG. 3. The purpose here is to measure the time period involved between the request for an action and the graphical update indicating the complete execution of that desired action. Now referring to reference marker B, the first step at step B1 is the start of the timer function which collects the current time from the Remote Client PC.

At step B2, a decision block is utilized to question whether the timer log file is open or not. If the log file is not open (NO), then the sequence proceeds to step B3 to open the log file. Likewise, if the log file is open (YES) at step B2, then the sequence proceeds to step B4 so that the start data (the date and time in milliseconds) can be cached, placing the time therein when the process started, into cache memory.

Then continuing on with FIG. 4 at the reference marker C (from FIG. 3) where at step C1 there is a stop action for the timer function which collects the current time at that instant. Next, at step C2 a calculation is made of the response time for that particular action for that particular TS Client Session, by calculating the difference between the stop time and cached "start time" which is referred to as the "response time". The process then continues by obtaining the action label, user ID and response time for that particular PC client, and this information at step C5, is placed into the timer log file of FIG. 4.

As was indicated in FIG. 3, the start and the stop timer functions are called for in every single designated action performed within the simulated client script for each and every single one of the multiple number of TS Client sessions. Therefore, an entry is made to the log file for every single designated script action for each and every one of the TS Client sessions.

FIG. 5 is an illustration of a prior art type of graphical analysis which was derived in the Windows Operating System and illustrates the limited information available in contrast to the greater amount of specific information available in the presently described performance measurement tool. Here, only a few limited varieties of information will be available since such a prior art system only showed utilization and number of active users.

In the present enhanced performance tool, it is now possible to view the test server 18 to see what the client users are getting in their simulated operations which information is all logged into the Timer Log File.

Thus, the present system captures log-on time, time to access an application and other specific details regarding each client-user that was previously not available in such graphs as that shown in FIG. 5.

The timer Log information in the present application can be printed out and also displayed in graphical format as is illustrated in the co-pending application, U.S. Ser. No. 09/661,101 entitled "Terminal Server Data File Extraction and Analysis Application". The Y axis or ordinate of FIG. 5, shows the number of active users which ranges in this case on the graph from 0 to 200 users. The X axis or abscissa, is an illustration of the percentage of total possible processor utilization that is operative related to the number of active users.

Observation of FIG. 5 will indicate the graph line G—G, which shows the number of users in active sessions at any given moment of time.

The graph line shown as R—R is an illustration of the percentage of total processor utilization that is occurring at each quantity of concurrent users. Thus, for example, when there are 112 Users, then it will be seen that the percentage utilization is 40%. Likewise, when there are 136 Users, then the percentage utilization is approximately 50%. The vertical markings on the graph R—R show that a reading has occurred at 15 second intervals, thus a period of 15 seconds has transpired through each of the vertical markers. This interval period of course, can be either increased or decreased, as necessary.

Thus, by observing this graph of FIG. 5, the amount of processor utilization can be viewed with respect to the number of Users in active sessions utilizing the Client PCs running simulated scripts. Thus one can see the approximate efficiency of the Terminal Server under each different set of operating conditions.

In the presently described enhanced performance tool, upon the completion of a test run, an Administrator can peruse the timer logs to determine the point at which the Test Server 18 failed to provide an acceptable end-user experience. The Administrator can determine this point by applying rules in regard to the maximum time a designated action can take. For example, An Administrator might establish 5,000 milliseconds as a limitation beyond which performance is determined to be non-optimal. Given that the test procedures gradually add client sessions on to the Test Server 18, the optimal performance will be found at the point where the last user initiates an action without exceeding this established limitation.

The method for performance test monitoring and analysis is seen to basically involve a series of steps which were shown in the attached drawings of FIGS. 3 and 4. A WTS (Windows Terminal Server) timer utility was illustrated in a series of steps in FIGS. 3 and 4.

Thus there has been shown the process of measuring response times for a variety of actions on a multiple number and expanding numbers of simulated clients. This process is designed to occur for each simulated client that connects to a Terminal Server using a test script modified with the Timer component functions.

Described herein has been a performance measuring method for enabling one to observe the overall operation of a terminal server solution which services multiple Client-Users. A simulated script is run on each Client-User and overall observations are made as to response time during different periods of operating conditions with variable numbers of concurrent Client-Users. From this observation, a designer or Administrator can configure the solution so that the system will only operate during optimal conditions and will not degrade into a non-allowable or non-acceptable operating situation.

While other embodiments of such performance methods may be implemented, the invention will be seen to be defined by the attached claims.

What is claimed is:

1. A system for performance testing of a server farm (10) means with multiple servers wherein each server services multiple Clients, comprising:

(a) server farm means (10) for servicing multiple Clients (10a–10n);

(b) means for connecting said server farm means to a Back-End Server means (14), to a Monitor-Control server means (16), and to a Test-Server means (18);

(c) said Back-End Server means (14) for providing a simulated real world environment to said server farm (10);

(d) said Monitor-Control Server means (16) for distributing and executing scripts and for collecting Timer Log files for performance parameters for each individual Client (10x);

(e) said Test Server (18) means for sensing mouse operations and keyboard strokes for each of said Clients (10x).

2. The system of claim 1 wherein said Monitor-Control Server means (d) includes:

(d1) means for timing the log-on period for each Client;

(d2) means for timing the time period involved in each Client (10x) for opening an application.

3. The system of claim 1 wherein said Back-End Server means is replaceable with a group of real world Clients.

* * * * *